United States Patent [19]
Baker et al.

[11] 3,909,685
[45] Sept. 30, 1975

[54] ELECTRICAL APPARATUS
[75] Inventors: Richard H. Baker, Bedford; Lawrence H. Bannister, Dedham, both of Mass.
[73] Assignee: Massachusetts Institute of Technology, Cambridge, Mass.
[22] Filed: Oct. 16, 1974
[21] Appl. No.: 515,290

Related U.S. Application Data
[63] Continuation-in-part of Ser. No. 432,939, Jan. 14, 1974, Pat. No. 3,867,643.

[52] U.S. Cl.............................. 318/139; 307/151
[51] Int. Cl.².......................................... H02M 7/00
[58] Field of Search...... 328/26, 260, 264; 307/117, 307/43, 44, 58, 82, 133, 151; 318/139; 321/5, 43, 44; 320/2–14

[56] References Cited
UNITED STATES PATENTS
3,867,643   2/1975   Baker et al. ........................ 307/151

Primary Examiner—Robert K. Schaefer
Assistant Examiner—John W. Redman
Attorney, Agent, or Firm—Arthur A. Smith, Jr.; Robert Shaw; Martin M. Santa

[57] ABSTRACT

Electrical apparatus wherein a plurality of batteries, for example, are controllably interconnected to form a power unit which accepts electric energy in a charging mode and feeds a load in a discharging mode. Controllers act through switches to interconnect the batteries in a way that permits them to accept unrectified electric energy from an a-c primary source the voltage and frequency of which may be variable; the energy is accepted over a substantial portion of the power cycle and the rate of charging is controllable; the controllers also interconnect the batteries in a way that permits the power unit to deliver energy to a load at a specified voltage and frequency. The power unit output can, for instance, be 60 cycle a-c, single or three phase. Thus, for example, the primary source can be a windmill-powered or water-powered generator whose output is a sinusoidal voltage that varies with wind or water velocity both in voltage and frequency and the power unit (or more probably a plurality of power units) can be used to provide 60 cycle single phase voltage for domestic use. In general, the batteries are charged in series and a controlled charging rate is maintained by a novel scheme for interconnection in a programmed fashion. The power unit can accept electric energy and feed a load as alternate conditions of operation, or a plurality of power units can be used to give simultaneous charge and feed; and the power unit can be employed as a substitute for the generator or other primary source, that is, to perform the function of an uninterruptable power supply (UPS). As a further example, the concept of changing roles can be employed in electric vehicle drives wherein the power unit electrically powers an a-c electric machine which acts as a motor during acceleration of the vehicle and as a generator during deceleration; the power unit feeds the motor at a variable voltage and variable frequency and accepts electric energy from the generator, again at variable voltage and variable frequency.

33 Claims, 16 Drawing Figures

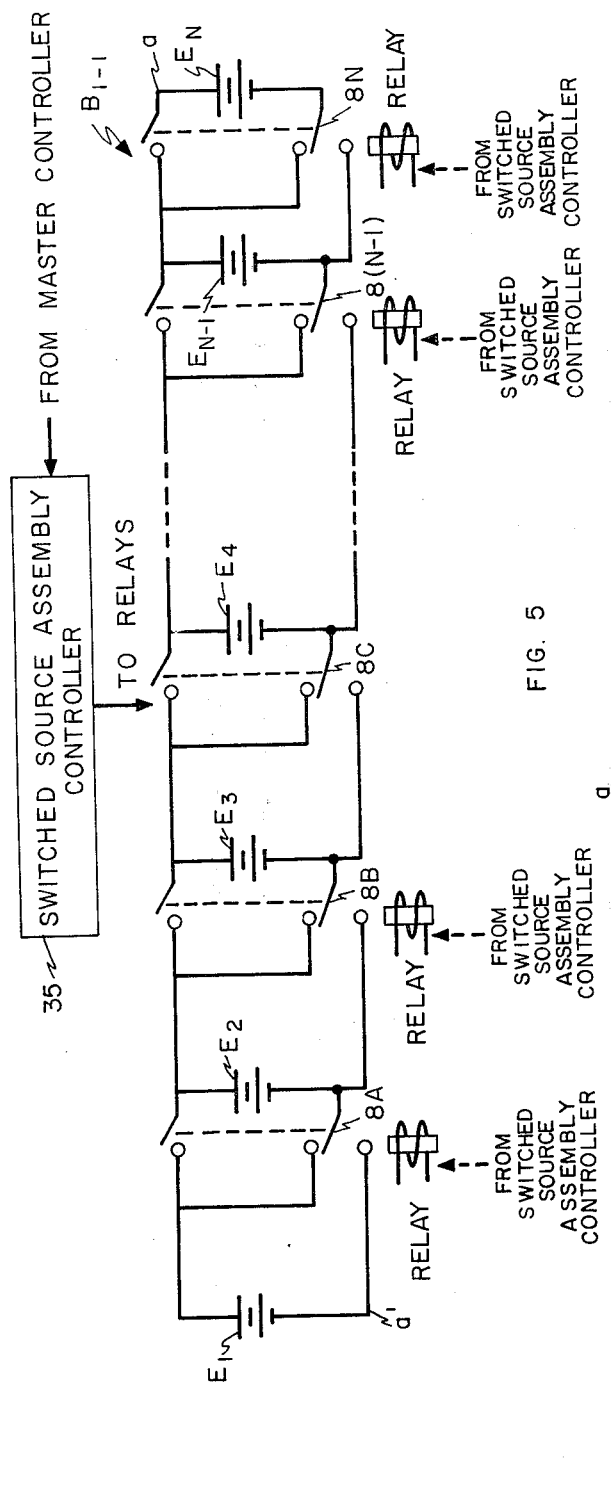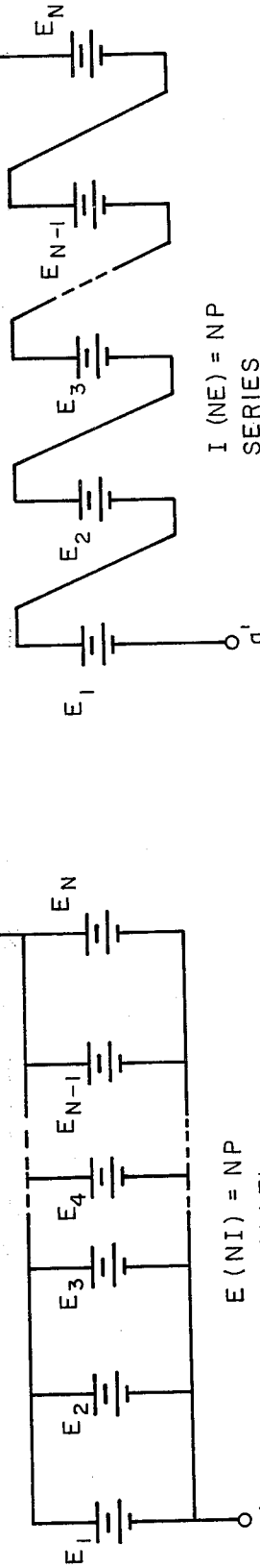
FIG. 5
FIG. 7
$I(NE) = NP$
SERIES
FIG. 6
$E(NI) = NP$
PARALLEL

ELECTRICAL APPARATUS

The invention described herein was made in the course of a grant from the Agency for International Development, an agency of the United States Government.

This is a continuation-in-part of the application Ser. No. 432,939, filed Jan. 14, 1974 now U.S. Pat. No. 3,867,643.

The present invention relates to apparatus wherein d-c sources such as, for example, storage batteries are controllably interconnected in a manner that provides at the power ports of the apparatus electric power that can vary both in voltage and in frequency, the voltage and frequency being variable to permit gross changes in both, but variable as well to permit small changes in both.

Attention is called to the following Letters Patent and applications therefor: U.S. Pat. Nos. 3,010,031, Baker (1961); 3,302,039, Baker (1967); 3,510,689, Baker (1970); 3,705,391, Baker (1972); 3,748,492, Baker (1973); Ser. No. 426,269, "Electrical Power Source," Bannister and Baker, filed Dec. 19, 1973; Ser. No. 360,501 "Electric Power Source," Baker, filed May 15, 1973.

There has long been a need for a processor that can take electric energy in kilowatt and above blocks, at one voltage and/or frequency and process that energy to supply a load at the same or some other voltage and/or frequency. By way of example, mention is made hereinafter of three situations wherein the foregoing possibility is particularly important: in uninterruptable power supplies (UPS); in windmill power generation; and in electric vehicles. In all three, batteries are employed. It suffices for present purposes to say that proposals heretofore made to solve the inherent problem have been inadequate. Accordingly, it is a principal object of the present invention to provide apparatus that is adapted to solve present problems of windmill power generation, electric vehicles, UPS and the like.

A further object is to provide apparatus wherein electric storage batteries are interconnected in a programmed fashion to accept, in a charging mode, electric energy that is variable in voltage and/or frequency and is programmed to deliver that energy, in a feed or discharge mode, at a voltage and/or frequency that may differ from the voltage and frequency of the charging source.

A still further object is to provide apparatus wherein a plurality of batteries are directly (i.e., without rectification) charged in series and parallel configurations from a variable-voltage and/or variable-frequency primary source of electric energy.

Another object is to provide apparatus wherein a plurality of d-c supply voltage means (e.g., solar cells, fuel cells, batteries, thermoelectric devices) are interconnected to provide a variable-voltage, variable-frequency output.

Still another object is to provide apparatus of more general scope.

These and still further objects are apparent in the discussion that follows.

The objects of the invention are achieved in apparatus in which a plurality of d-c supply voltage means such as, for example, electric storage batteries, are programmably interconnected to provide a voltage and current capability, that is variable in amplitude and/or frequency. The variability in the case of batteries, to which the major part of the specification is directed, has two most important consequences: the batteries can be programmably interconnected to supply electric energy at variable voltage and variable frequency, but the batteries can also be programmably interconnected to receive electric energy at variable voltage and frequency and over a substantial portion of the power cycle.

The invention is hereinafter described with reference to the accompanying drawing in which:

FIG. 1 is a schematic representation, partly in block diagram form, of a SET processor made up of two power units and associated switching to permit variable-frequency, variable-voltage power from a windmill to be stored and processed to provide, as required, a single voltage and single frequency, each power unit being made up of a plurality of stages, each stage including batteries except that in at least one stage the battery is a variable-voltage battery means;

FIG. 5 shows schematically a switched source assembly that forms the variable-voltage battery means of FIG. 1 and that comprises a plurality of electric sources and switches;

FIG. 6 shows schematically a parallel connection of the electric sources in the switched source assembly;

FIG. 7 shows schematically a series arrangement of the electric source in the switched source assembly;

Figure 1:
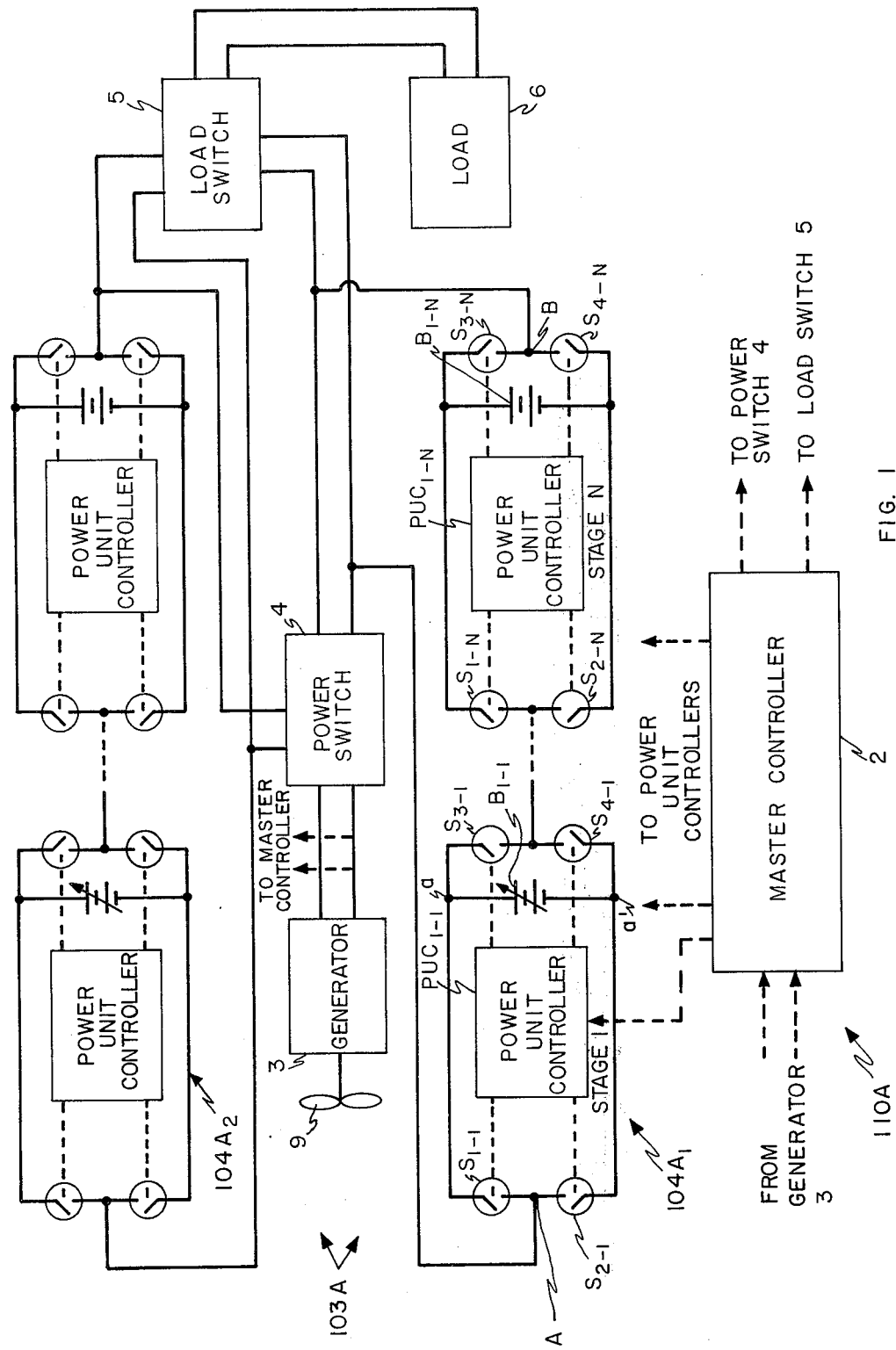

Before going into a detailed explanation of the invention with reference to the figures, some preliminary remarks are in order. The invention is multi-faceted: it is useful, for example, in a power system to ensure uninterrupted power to a computer or other load; it is useful in a power system involving windmill generators that provide electric energy at varying voltage and frequency; it is useful in electric automobile drives since, among other things, electric energy can flow to or from drive motors in apparatus employing the present concepts; and it is useful in other situations, all as noted herein. As the description unfolds, it will become evident that the active parts are like a Chinese puzzle, that is, a box within a box, within a box, etc. Thus, with reference to FIG. 12, a SET grid 101 (SET is used herein to denote stored energy transfer) is shown composed of a plurality of SET systems 102A, 102B . . . which, in turn, are composed of a plurality of SET processors 103A, 103B . . . . The SET processors 103A, 103B . . . comprise variable-voltage, variable frequency power units 104A$_1$ . . . (also termed "3-V-f" herein); the power units 104A$_1$ . . . , as later shown, consist of a plurality of batteries or other supply voltage means interconnected through bilateral switches in a way that permits a power unit to accept electric energy to effect charging of the batteries, the accepted energy being, in some circumstances, variable in voltage and/or frequency, and/or to deliver electric energy to a load, at the same or different voltage and/or frequency as the accepted energy. In the following discussion and in the figures, the supply voltage means used the most is a battery or a plurality of batteries, but the invention embraces also other d-c supply voltage means such as solar cells, capacitors, fuel cels, thermoelectric devices and the like. It will be shown that a 3-V-f is capable of providing a time varying output waveform that is both variable in voltage and variable in frequency. (Furthermore, while it is a usual case to work with sinusoidal waveforms, the 3-V-f is capable of generating other well-known and useful periodic, but non-sinusoidal waveforms such as, for example, saw-toothed waveforms, triangular waveforms, square waveforms, etc.) This is done by having at least one battery pack of the set of batteries making up the 3-V-f in the form of a switched source assembly (see FIG. 5) wherein a plurality of batteries or battery cells are interconnected selectively to supply desired levels of voltage and current at the terminals of the 3-V-f. In the paragraphs that now follow and in the figures, circuit elements that perform the same or similar functions are assigned the same or similar labels.

By way of general outline, there follows first a discussion of the basic unit herein, the power unit, including details of charge and discharge, then the power unit in a windmill generating environment (at that juncture the SET processor, SET system and SET grid concepts are introduced), then the power unit in a vehicular drive system, and, finally, the power unit to provide uninterrupted power to a load.

Figure 2:
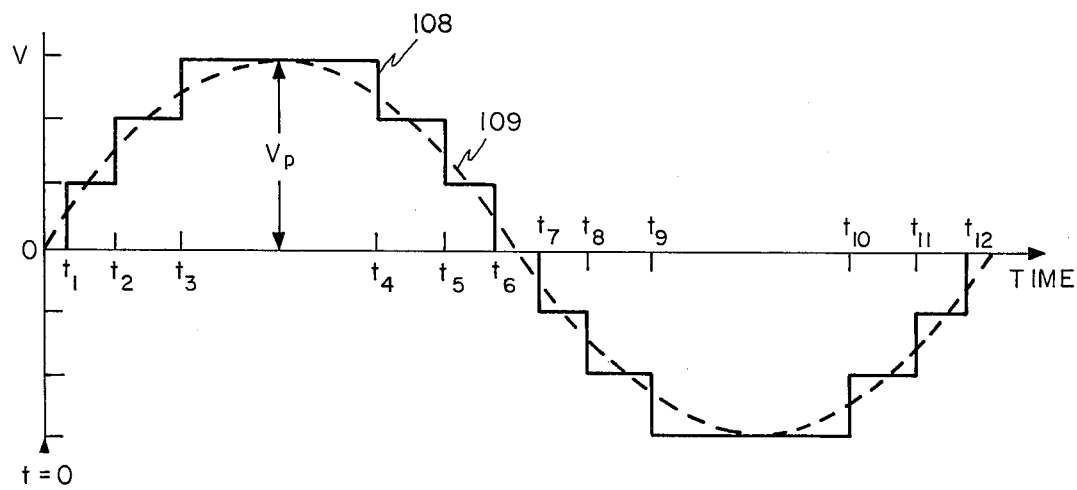
FIG. 2 shows a quasi-sine wave output from the SET processor of FIG. 1.
Figure 3A:
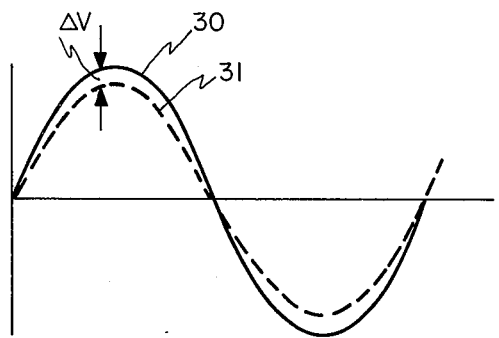
FIGS. 3A and 3B show a waveform from a primary source of electric energy and the waveform from a SET processor, the two being separated from one another by an instantaneous difference voltage $\Delta V$ arrived at by controlling the voltage output of the SET processor, FIG. 3A representing a charging mode and FIG. 3B a feed mode SET processor.
Figure 3B:
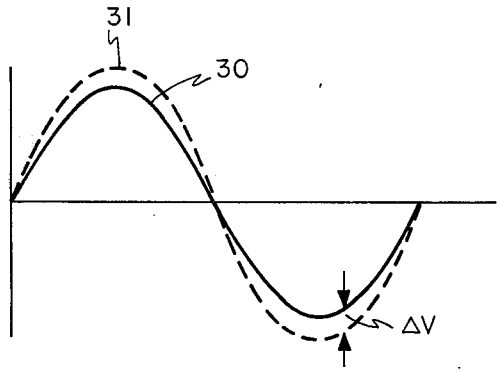
Figure 4A:
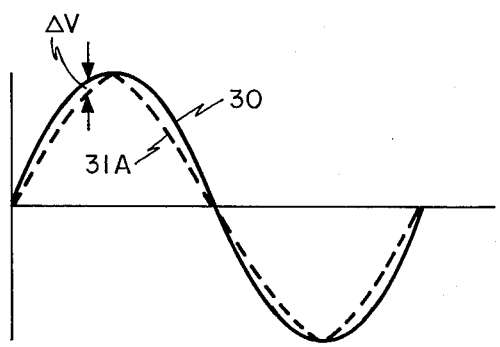
FIGS. 4A and 4B show two waveforms, similar to those of FIGS. 3A and 3B, respectively, but $\Delta V$ is arrived at by controlling the time phase of the output of the SET processor.
Figure 4B:
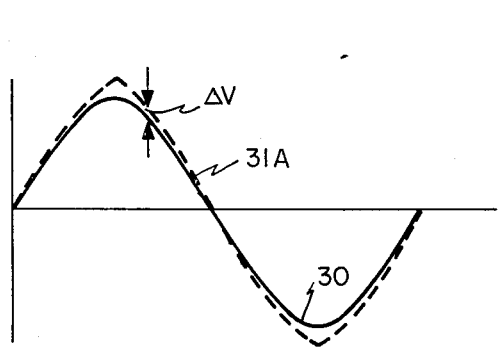

Turning now to FIG. 1 apparatus is shown at 110A comprising a SET processor, again marked 103A, composed of the two power units 104A$_1$ and 104A$_2$. It is assumed for present purposes that the two power units are identical although conceptually they need not be; anyway, the power unit 104A$_1$ only is described here, and its elements only are labeled. The power unit 104A$_1$ is composed of N stages, 1 . . . N, each stage comprising supply voltage means, here batteries B$_{1-1}$ . . . , B$_{1-N}$, respectively, first bilateral switch means S$_{1-1}$, S$_{2-1}$ . . . S$_{1-N}$, S$_{2-N}$, respectively, second bilateral switch means S$_{3-1}$, S$_{4-1}$ . . . S$_{3-N}$, S$_{4-N}$, respectively, and power unit controller means PUC$_{1-1}$ . . . PUC$_{1-N}$ that acts to control the first switch means and the second switch means in the associated stage to provide from the combined stages a time varying voltage waveform (the waveform labeled 31 and 31A in FIGS. 3A, 3B, 4A and 4B) as output from the power unit 104A$_1$. The operation of the apparatus 110A is monitored and directed by a master controller 2, as hereinafter discussed. It is sufficient at this juncture to note that the master controller receiver voltage signals from the output of a generator 3 and on the basis thereof provides proper signals to the power unit controllers as well as to a power switch 4 and a load switch 5. The generator 3 may be driven by a windmill 9 and, as shown, delivers power to the power units 104A$_1$ and 104A$_2$ alternately, that is, the power switch 4 connects the generator either to the power unit 104A$_1$ or the power unit 104A$_2$; meanwhile the load switch 5 switches the load-bearing duties to the power unit not connected to the generator. More will be said about this load-switching function, but for now its occurrence only need be noted. The output of the processor 103A is assumed to be single-phase, quasi-sinusoidal waveform of single frequency, e.g., 120 volts, 60 Hz, single phase for powering a dwelling unit of other load 6. The battery B$_{1-1}$ is shown to be variable; the manner of accomplishing the necessary variation in B$_{1-1}$ is discussed later but for now it is assumed to be such. In this situation the voltage available at power ports A and B of the power unit 104A$_1$ can be changed. Thus, both the voltage and the frequency at the power ports A and B can be changed to apply variable-voltage, variable-frequency, quasi-sinusoidal power to the load 6; but in the discussion in this paragraph that feature is ignored as applied to the load. It is used, rather, in the charging mode of operation as now explained with reference to FIGS. 2, 3A, 3B, 4A and 4B. The quasi-sinusoidal waveform shown in FIG. 2 is identical to that shown in said application for Letters Patent, Ser. No. 432,939 (Baker and Bannister). As shown in FIGS. 3A, 3B, 4A and 4B, charging is effected by adjusting the voltage of the variable battery means B$_{1-1}$ to a value that will give an instantaneous voltage across the power ports A-B (on the waveform labeled) 31 in FIGS. 3A and 3B) that is slightly less than the instantaneous voltage on the waveform labeled 30 of the generator 3. The instantaneous difference between the two instantaneous voltages can be affected also by phasing or timing the power-unit waveform as shown at 31A in FIGS. 4A and 4B. In practice, since the battery B$_{1-1}$ is changed in steps and is not infinitely variable, both phase control and voltage control should be used; the magnitude and polarity of the difference voltage marked $\Delta V$ determines the direction and magnitude of current flow between the generator and the power units 104A$_1$ and 104A$_2$ — i.e., the charging rate of the serially connected batteries and, as later shown, the magnitude of the difference voltage $\Delta V$ can be used to limit the outgo of power from a power unit in the feed mode. There is discussed in the next paragraph with reference to FIGS. 5, 6 and 7, a switched source assembly which forms the variable voltage battery means B$_{1-1}$ and is so labeled.

The switched source assembly is made up of a plurality of electric sources E$_1$, E$_2$ . . . E$_N$ interconnected by switches 8A . . . 8N to provide variable voltages and current between points $a$—$a'$ in FIG. 1. The electric sources again are batteries or battery cells which are interconnected in the parallel arrangement of FIG. 6 or the series arrangement of FIG. 7 or some series/parallel combination by the switches 8A . . . to give the desired voltage and current from the switched source assembly at the points $a$—$a'$. Switching is effected by appropriate relays, as shown, under the direction of the master controller 2 directly or through a switched source assembly controller 35. It should be pointed out here that the switches 8A . . . (as well as the various switches in FIG.

1 and later-discussed switches), can be semiconductor switches of the type described in great detail in said U.S. Pat. No. 3,748,492 as well as some of the other patents and applications made of record above. It should be pointed out at this juncture that by appropriate programming of the various controllers, the switches 8A . . . can be made to switch only at times when the switches are conducting no current to minimize degradation of the switches. The variable voltage and current battery means thereby provided results in a power unit 104A that has available at its power ports A and B a quasi-sinusoidal or other waveform that is variable both in voltage amplitude and frequency in a fashion determined by the master controller. The power ports (e.g., A and B) of the power units, as above noted, both accept and deliver power. Thus the ports A and B are output ports of the power unit when it is acting as a source of energy during the feed mode of operation and are input ports during the charging mode. Also, current flow alternates in both modes, being in at the port A and out at the port B and vice versa in the course of operation. (Similar remarks apply to input and output as applied to the individual stages, SET processors, etc.)

Figure 8:
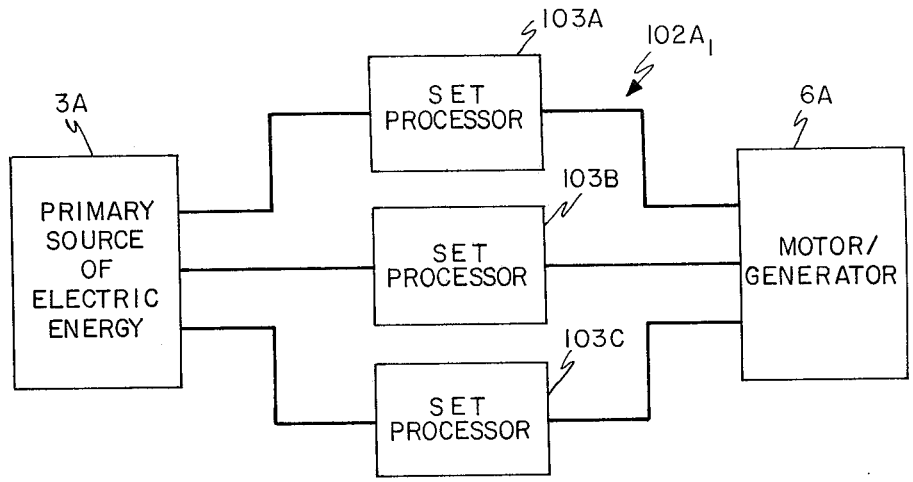
FIG. 8 shows diagramatically and in block diagram form three SET processors.

One further matter should be touched upon here before moving on since it applies in all exemplary situations herein described. In FIG. 8 three SET processors 103A, 103B and 103C are shown connected to receive charging input from a primary source 3A and to deliver power to a motor 6A. In terms of the designation being used, the plurality of SET processors constitute a SET system which is labeled 102A$_1$. The three SET processors 103A, 103B and 103C can be connected to receive single-phase power and feed a single-phase motor, they can be connected to receive three-phase power and deliver three-phase power, but, also they can be connected to receive single-phase power, for charging, and deliver three-phase power. The latter feature is particularly important in connection with the vehicular drive systems wherein the vehicle drive motor is a polyphase machine 6A which is powered by a SET system, like that in FIG. 8, connected to deliver quasi-sinusoidal, three-phase, variable-frequency and variable-voltage electric energy. However, the batteries in the SET system are usually recharged by plugging into a 120-volt, single-phase outlet. Also, as is later explained in greater detail, the machine 6A acts during a part of the cycle to deliver three-phase power to the SET system. The necessary switching to provide the foregoing alternatives is readily accomplished in the power units herein disclosed.

Figure 9:
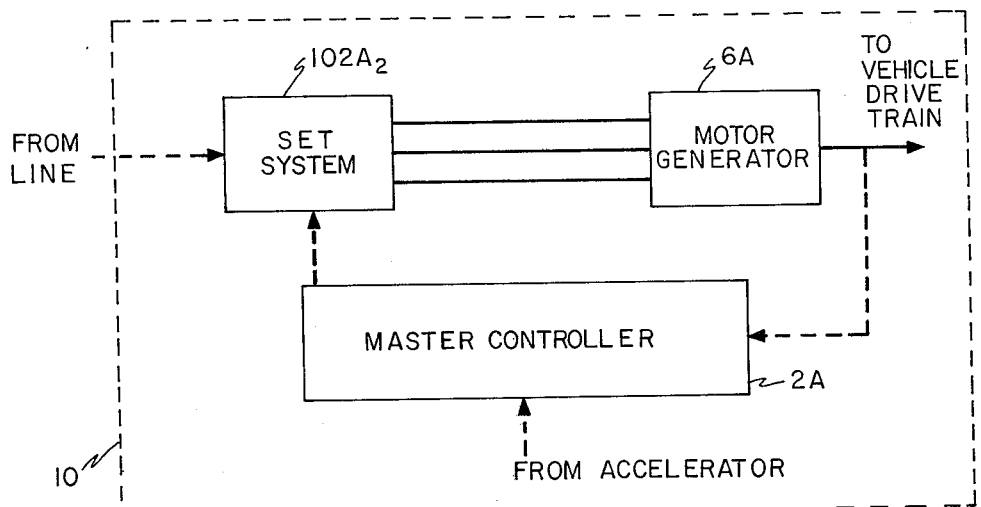
FIG. 9 shows a SET system comprising a plurality of SET processors as part of a vehicle powering arrangement.

In FIG. 9 the numeral 10 designates a vehicle driven by the variable-speed electric machine 6A which acts as a motor when the vehicle is being accelerated and acts as a generator when the vehicle is being dynamically braked. One machine performs both functions and it can be a three-phase squirrel cage motor which can act as a generator during deceleration, a synchronous machine, or some other. Acceleration and deceleration are called for, as in a standard combustion-engine driven automobile, by an accelerator which sends an appropriate signal to a master controller 2A and the master controller, in turn, delivers appropriate control signals to the SET system labeled 102A$_2$. It will be appreciated that in a three-phase motor, changes in frequency to modify its rotational speed must be accompanied by changes in applied voltage; the 3-V-f herein disclosed, as above discussed, can supply both variable frequency and variable voltage. Also, and just as is the case with the generator 3, the machine 6A, when generating, provides input to the SET system 102A$_2$ that varies both in frequency and voltage.

Figure 10:
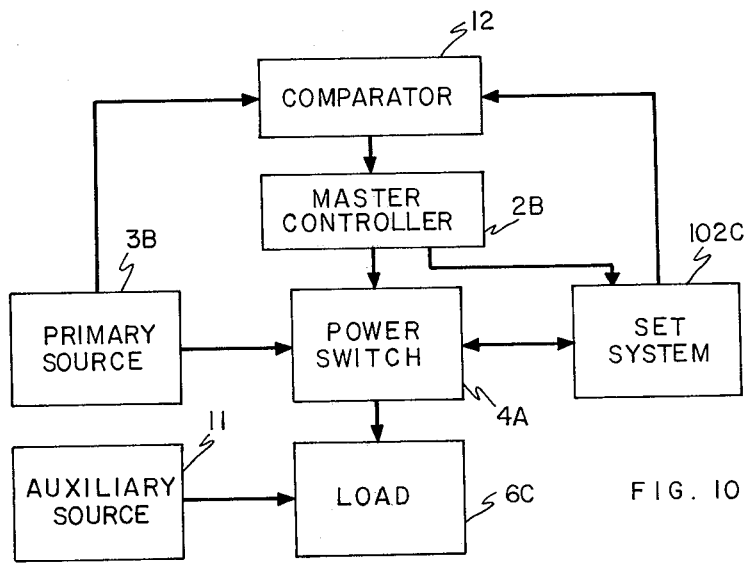
FIG. 10 shows in block diagram form a SET system for use in an uninterruptable power supply (UPS)

In the flow diagram in FIG. 10, the load shown at 6C can be a computer or some other load which cannot tolerate loss of power for even a substantial part of a cycle. To accomplish the required purposes a polyphase SET system 102C is employed. The load receives power from a polyphase primary source 3B during normal operation and at the same time batteries in the SET system 102C are kept fully charged from the same primary source. In case of failure of the primary source 3B, a power switch 4A shifts the load bearing responsibility from the primary source to the SET system 102C. The SET system carries the load until an auxiliary generator or other source 11 can be activated or until the primary source 3B returns to normal. It is necessary that the SET system 102C take over in the order of 100 microseconds after failure of the primary source. This can be accomplished by using semi-conductor switches of the type described in said patents and applications, under the direction of a master controller 2B. A comparator 12 notes differential voltages between the SET system 102C and the primary source and gives an appropriate signal to the master controller for appropriate setting of the power switch 4A. The comparator thus monitors the output voltage of the SET system 102C and supplies appropriate signals to the master controller to regulate the charging rate of the batteries in the SET system 102C. In this connection, since the batteries in the system 102C are always (or almost always) fully charged, they should have a useful life of several years. The switching and control functions can be more easily explained with respect to the single-phase UPS arrangement of FIG. 11 wherein a reference generator 13 provides a sinusoidal reference waveform $V_A$ and a power unit 104B provides a quasi-sinusoidal waveform $V_B$.

Figure 11:
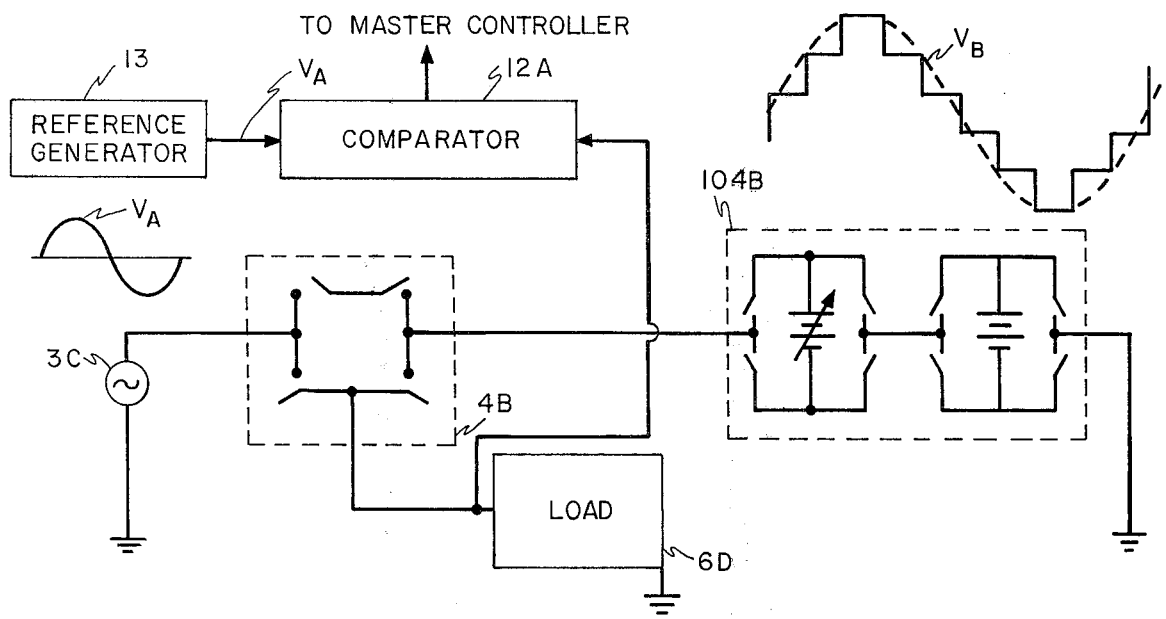
FIG. 11 shows schematically and in block diagram form, a single-phase UPS.

In FIG. 11, the voltage signals $V_A$ and $V_B$ are fed as input to a comparator 12A (e.g., a differential amplifier) which has an output $\pm \Delta V = V_A$ (instantaneous) $- V_B$ (instantaneous). The comparator output is connected as input to a master controller which regulates operation of the switches in the power unit 104B and the load switch labeled 4B. Again, a load 6D is fed by either a primary source 3C or the power unit 104B. In an accompanying application for Letters Patent entitled "Multi-Node Electrical Network" which is hereby incorporated herein by reference, there is described what is called a "power-T" which can be employed as the power switch 4B. The UPS arrangement in FIG. 11 with a power-T at 4B can pick up the load in about 10 microseconds. In other words, in case of a transient situation the voltage applied to the load never drops very far; also the power-T requires that the power unit 104B carry the load for the remainder of a cycle following a glitch or failure.

Figure 12:
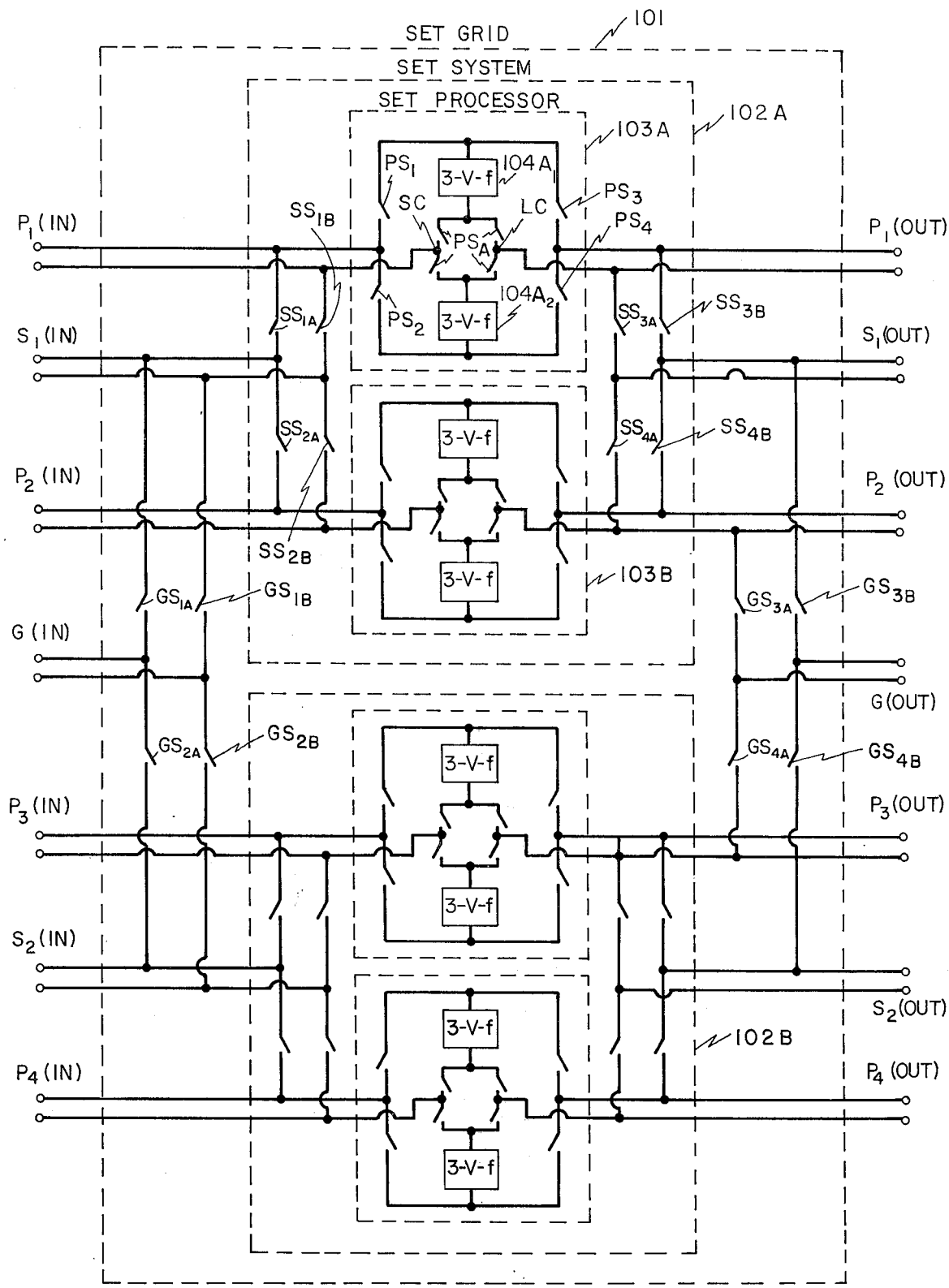
FIG. 12 shows a SET grid comprising a plurality of SET systems.

Returning to FIG. 12, one SET processor in the SET grid 101, the processor 103A, is now discussed further. In the processor 103A, the 3-V-f units 104A$_1$ and 104A$_2$ alternate between conditions of receiving and delivering power as before discussed, single-phase power being delivered at a terminal $P_1$ (in) and delivered to a load circuit at $P_1$ (out). Power flow is switched from one 3-V-f unit to the other by processor switches PS$_1$ and PS$_2$ which are like the switches S$_{1-1}$, etc., in FIG. 1 and connect the input line to one side of a 3-V-f. The other side of the line, for simplicity labeled SC (for source common), is connected through similar type switches $PS_A$. On the load side, switches $PS_3$ and $PS_4$ serve to alternate the load bearing duties between power units $104A_1$ and $104A_2$, respectively. Again, the second connection to the load is through the switches $PS_A$ to LC (for load common). All the switches in FIG. 12 are sequenced by a master controller, as before. Further elements in FIG. 12 include system switches (e.g., $SS_{1A}$, $SS_{2A}$, etc., and $SS_{1B}$, $SS_{2B}$, etc., and grid switches $GS_{1A}$, $GS_{2A}$, etc., and $GS_{1B}$, $GS_{2B}$, etc. Thus a particular SET processor can receive charging energy, can store it, and can deliver it, at the received frequency and voltage or at a different frequency and/or voltage, to a load or to the SET system or to the SET grid. It is not believed necessary to discuss further the various circuit ramifications of the apparatus.

Figure 13A:
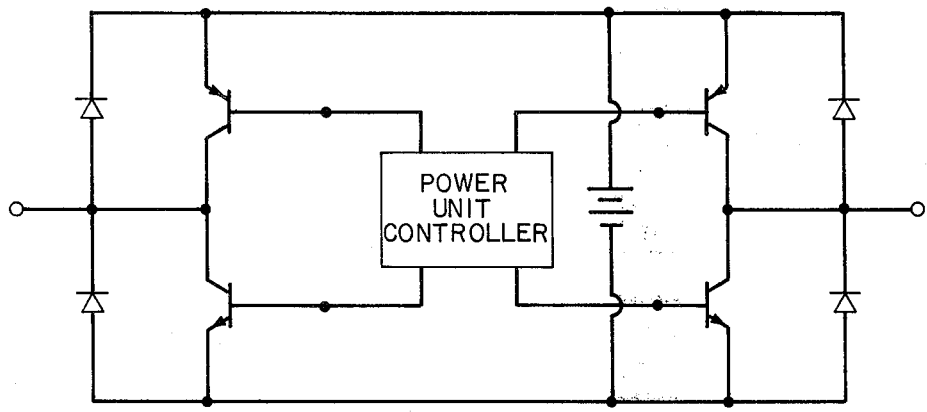
FIGS. 13A and 13B shows two forms of bilateral solid state switches that can be used in connection with the present invention.
Figure 13B:
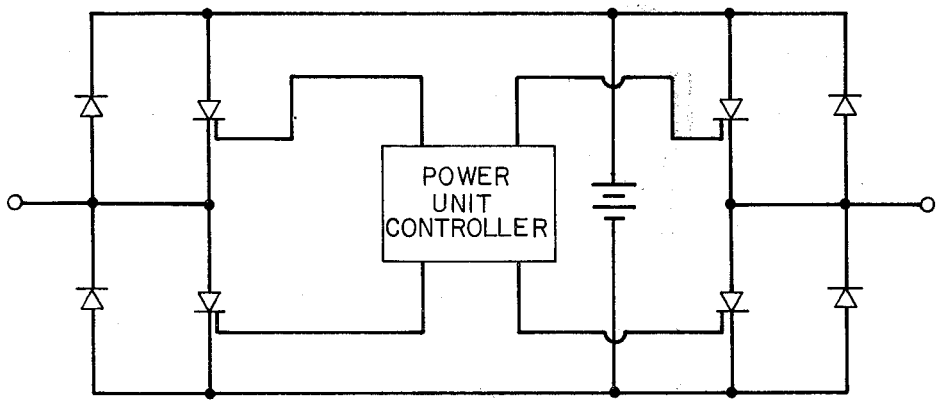

Two switch configurations are shown in FIGS. 13A and 13B which show bilateral solid-state switches for use as the switches $S_{1-1}$ etc., in FIG. 1, the power switch 4, the load switch 5 etc., as well as the various switches in the other circuits. Further switches and switching arrangements are discussed in said application Ser. No. 432,939, filed Jan. 14, 1974 and in an application entitled "Bilateral Solid-State Electrical Switch" Ser. No. 426,269, filed Dec. 19, 1973. The power unit controller in each stage can be a bistable circuit somewhat similar to those bistable circuits discussed in said U.S. Pat. No. 3,748,492, but other controllers can be used.

It should be apparent on the basis of what has been said herein, that the timing of the various switching functions is of critical importance to proper operation of the apparatus disclosed. Such timing is provided by the master controller through appropriate trigger circuitry which can be incorporated in the controller or be separated therefrom. Triggering can be accomplished by flip-flop circuits or other well-known circuitry. The actual controlling or directing function can be effected by a microprocessor that includes (as is well known to workers in this art) a clock, flip-flops, gates and other assorted circuitry interconnected to perform standard data processing functions such as, for example, signal missing, time sequence generation, code selection, etc.: see for example, basic logic circuits in the test, "Analog-to-Digital/Digital-to-Analog Conversion Techniques," (David F. Hoeschele, Jr., John Wiley & Sons, Inc., 1968); "Digital Computer Fundamentals" (Thomas C. Bartel, McGraw-Hill Book Company, Inc., 1960); and many articles in trade journals, for example, *Electronics*, Nov. 8, 1973 and other issues. Controller functions can be attained by using standard microprocessor units readily available in chip form from many manufacturers.

A number of salutary consequences touched upon earlier, but not readily apparent, accrue from the present invention as now discussed. By way of illustration and with reference to FIG. 9, the SET system $102A_2$ can change the frequency fed to the machine 6A, it can change the voltage fed to the machine 6A, and it can otherwise change the power input to the machine by cycle skipping (i.e., by missing voltage cycles). The vehicle 10, since it has large inertia, does not respond quickly to changes in any one of the three possible parameters just noted. If frequency is changed momentarily, for example, the motor will continue to rotate, for a little while, at its previously-existing angular velocity; but its field which, for purposes of the present explanation has zero inertia, will rotate faster and its angular velocity can indeed be made to exceed the angular velocity of the machine rotor. In this latter circumstance, the machine 6A acts as a generator, but it will be appreciated that between the instant when it is, say, a fully loaded motor and a fully-loaded generator, the current changes in magnitude from, say, +1 to −1 and all values in between. Thus, the SET system $102A_2$ can act as a current limiter for momentary or short-term limitation of current to the rotating machine 6A under appropriate signals from the master controller 2A. Similarly, it will now be appreciated that momentary changes in voltage can be employed to limit current. Now what is the real main concern here is prevention of overload either on the SET system $102A_2$ or on the rotating machine 6A. Another method of accomplishing the desired end is to skip cycles of pseudo-sine-wave output of the SET system $102A_2$; such skipping can easily be accomplished in the present apparatus, as can be seen, by omitting some clock pulses in the master controller 2A. To place the explanation in this paragraph in some context, changes in power flow between the SET system $102A_2$ and the machine 6A of the order of 4:1 can be accomplished by voltage change, of the order of 2:1 by frequency change, and of the order of 2:1 by cycle skipping. Also, by now it should be apparent that cycle skipping can be combined with frequency to provide changes in the rate of motion of the machine 6A.

The foregoing discussion has centered around a situation wherein the primary source has varying voltage and/or varying frequency. The usual such waveform is a-c, and sinusoidal but need not be either sinusoidal or a-c; it can be uni-directional, as well, that is, while not emphasized here, the primary source can be d-c; the present concepts are particularly useful in connection with a d-c primary source in three situations: where the output is required to be a varying voltage such as, for example, a-c; where the output is required to be a very precisely regulated d-c; and where the regulation of the d-c primary source is such that its voltage output varies to a substantial and undesirable extent.

It will be appreciated that control functions can be combined in a single unit, e.g., the master controller and the power unit controller can be so combined, but each function can be discerned in the single unit.

Further modifications of the invention herein described will occur to persons skilled in the art and all such modifications are deemed to be within the spirit and scope of the invention as defined by the appended claims.

What is claimed is:

1. Apparatus that comprises a variable-voltage variable-frequency electric power unit that includes a plurality of stages connected in cascade, each stage having supply voltage means, first bilateral switch means and second bilateral switch means, the first bilateral switch means and the second bilateral switch means acting in combination such that the input of the stage and the output of the stage are shorted together and therefore at equal potential, or said supply voltage means is connected between the input and the output such that the output is positive with respect to the input or the output is negative with respect to the input, the supply voltage means in at least one of the stages of the plurality of stages comprising a switched source assembly having a plurality of electric sources that act in concert through electrical interconnection as the supply voltage means of said one of the stages, and means for changing the interconnection of the plurality of electric sources in the switched source assembly, thereby to alter in a determined fashion the voltage and the current available from the switches source assembly and hence from said apparatus.

2. Apparatus as claimed in claim 1 in which the supply voltage means and the electric sources comprise rechargable batteries and in which electric energy passes through the same power ports of the power unit in both a charging mode of power unit operation and a discharging mode of power unit operation.

3. Apparatus as claimed in claim 2 that includes controller means which acts to sequence the first bilateral switch means, the second bilateral switch means and the means for changing the interconnection of the plurality of electric sources in a pattern that provides at the power ports of the power unit a time-varying waveform whose amplitude and frequency can be varied under the control of the controller means in a way that effects controllable transfer of electric energy to and from the power unit at said power ports.

4. Apparatus as claimed in claim 3 that further includes charging means connected to the power ports of the power unit, signals indicative of the instantaneous voltage output of the charging means being connected as input to the controller means, the controller means acting in response to said signals to provide an instantaneous voltage output of the power unit that bears the proper relationship to the instantaneous voltage output of the charging means required to effect the desired energy transfer.

5. Apparatus as claimed in claim 4 in which the charging means is a primary source of electric energy having a time varying voltage waveform, the power unit, under the direction of the controller means, providing a voltage waveform at said power ports that approximates that of the primary source and bears a relationship thereto such that the batteries are charged in the charging mode over a substantial fraction of the power cycle of the primary source.

6. Apparatus that includes a plurality of the power units claimed in claim 5 connected in a polyphase configuration and in which the primary source is of the same polyphase configuration.

7. Apparatus as claimed in claim 5 in which the time-varying voltage waveform of the primary source is sinusoidal and the time-varying voltage waveform of the power unit is quasi-sinusoidal.

8. Apparatus as claimed in claim 7 in which the time-varying voltage waveform of the primary source varies in a pseudo-random fashion both as to voltage and as to frequency.

9. Apparatus having a plurality of the variable-voltage, variable-frequency power units of claim 3 interconnected to form a stored-energy processor and that includes processor switch means that acts in concert with the switch means of each power unit, under the direction of the controller means, such that the processor can receive unrectified a-c electric energy over a substantial fraction of the power cycle of the source of such a-c electric energy, and can process and store the energy such that it can subsequently be delivered to the processor power ports at the same or different frequency and/or the same or different voltage as that of said source.

10. Apparatus having a plurality of stored-energy processors of claim 9 interconnected to form a stored-energy system and that includes system switch means that acts in concert with the processor switch means and the switch means of each power unit, under the direction of the controller means, such that the system can receive unrectified a-c electric energy over a substantial fraction of the power cycle of the source of such a-c electric energy and can process and store the energy such that it can subsequently be delivered to the system power ports at the same or different frequency and/or the same or different voltage as that of said source.

11. Apparatus having a plurality of the stored-energy systems of claim 10 interconnected to form a stored-energy grid and that includes grid switch means that acts in concert with the system switch means, the processor switch means and the switch means of each power unit, under the direction of the controller means, such that the grid can receive unrectified a-c electric energy over a substantial fraction of the power cycle of the source of such a-c electric energy, can process and store the energy such that it can subsequently be delivered to the grid power ports at the same or different frequency and/or at the same or different voltage as that of said source.

12. Apparatus as claimed in claim 3 that further includes an electric machine electrically powered by the power unit and adapted to receive electric energy from the power unit during one portion of an operating cycle and to deliver electric energy to the power unit during another portion of the operating cycle, said machine acting as an electric motor during the first-mentioned portion of the cycle and as a generator during the second-mentioned portion of the cycle to recharge the batteries.

13. Apparatus as claimed in claim 12 having feedback means connected from the terminals of the said machine as an input to the controller means permitting control of said interconnection such that there results a controllable transfer of electric energy from said power unit to said machine when the machine is acting as a motor and from said machine to the power unit when the machine is acting as a generator.

14. Apparatus as claimed in claim 13 in which said machine is the prime mover of an electrically-driven vehicle, said machine acting as a motor during acceleration of the vehicle and as a generator during deceleration of the vehicle and which further includes means for controlling the speed of the vehicle, the latter means being connected as a further input to the controller means to influence electric energy transfer between the power unit and said machine.

15. Apparatus as claimed in claim 14 in which a plurality of power units is connected to provide polyphase power and in which said machine is a polyphase machine, means being further provided to permit the plurality of power units to connect to a single-phase or to a polyphase source of electric energy for battery charging.

16. Apparatus as claimed in claim 3 that includes a primary source of electric energy and a load connected to receive an input from the primary source and an input from the power unit, and that further includes means for quickly shifting the input to the load from the primary source to the power unit to prevent interruption of power to the load.

17. Apparatus as claimed in claim 16 in which the means for shifting comprises load switching means that acts to transfer the load from the primary source to the power unit during transient and long-term outages of the primary source.

18. Apparatus as claimed in claim 16 in which the primary source of electric energy is a source of sinusoidal, a-c power, signals indicative of the instantaneous voltage of the primary source being connected as input to the controller means, the controller means acting in response to said signals to provide an instantaneous voltage at the power ports of the power unit relative to the instantaneous voltage of the primary source such that controllable energy transfer between the source and the power unit is effected, said transfer occurring over a substantial fraction of the power cycle of the primary source.

19. Apparatus as claimed in claim 3 that includes a primary source of electric energy, a load connected to receive an input from the primary source and from the power unit, the primary source being connected to deliver electric energy to both the load and the power unit, and means interconnecting the three circuit elements comprising the primary source, the load, and the power unit such that electric current can flow from the primary source to the power unit and to the load and from the power unit to the load, said means for interconnecting being capable, as well, of electrically isolating the three circuit elements, thereby to permit the power unit to act as an active filter that assumes load bearing duties in the event of short-term or long-term failure of the primary source.

20. Apparatus as claimed in claim 3 that further includes a primary source and a load, the primary source and the power unit being connected in parallel and to the load, the power unit being adapted to receive electric energy from the primary source and to deliver electric energy to the load through the same power ports, the power unit thereby acting as an active filter for short-term and long-term power transients.

21. Apparatus as claimed in claim 20 that further includes comparator means, a reference source connected as one input to the comparator means, a feedback signal from the load connected as the other input to the comparator, the comparator output being connected as input to the controller means to control the transfer of electric energy to and from the power unit.

22. Apparatus as claimed in claim 3 that includes a-c generating means whose output voltage and frequency are randomly variable, connected to the power ports of the power unit, said a-c generating means acting as a source of charging energy for the batteries, feedback means being connected between the generating means output and the controller means to provide a signal to the controller means indicative of the instantaneous voltage output of the generating means, the controller means acting to provide interconnection of batteries in a pattern whereby the instantaneous voltage of the time-varying voltage waveform output from the power unit at all times bears a controllable relationship to the instantaneous voltage of the generator, thereby to allow the batteries to accept unrectified electric energy from the generating means over a substantial fraction of the power cycle of the generating means and to permit a controllable charging rate for the batteries.

23. Apparatus as claimed in claim 22 in which the a-c generating means is a generator driven by a windmill whose angular velocity varies over a wide range of values.

24. Apparatus as claimed in claim 1 in which the plurality of electric sources in the switched source assembly comprises a plurality of energy storage cells and in which the switched source assembly further includes controllable switched source assembly switch means operable to connect all or any portion of the cells in compatible series, parallel and/or series-parallel configurations to alter the voltage and current available from the switched source assembly.

25. Apparatus as claimed in claim 24 in which the supply voltage means in all the stages and including the energy storage cells are electric storage batteries.

26. Apparatus as claimed in claim 25 in which the switched source assembly switch means is a plurality of bilateral switches and that includes switched source assembly controller means to program the interconnection of the batteries in the switched source assembly.

27. Apparatus as claimed in claim 26 that includes power-unit-controller means to program the first bilateral switch means and the second bilateral switch means.

28. Apparatus as claimed in claim 27 that further includes a primary source of electric energy connected as input to the power unit and master controller means that acts to program the power-unit controller means and the switched source assembly controller means, such that the apparatus can accept electric energy from said primary source or, as an alternate condition of operation, can deliver electric energy to a load or back to the primary source, said load having the same or different electrical characteristics relating to frequency, voltage and current, as the primary source.

29. Apparatus in which a plurality of the variable-voltage, variable frequency power units of claim 24 are connected in polyphase configuration, and that includes as a load a polyphase electric motor connected to receive as input thereto the output of the polyphase-connected power units and that further includes controller means operable to sequence the power units in a way that provides a polyphase output from the interconnected power units, the controller means acting to effect changes in the voltage and frequency of the polyphase output thereby to permit control of the velocity of the motor.

30. Apparatus as claimed in claim 29 in which the electric motor is the prime mover of an electric vehicle and in which the motor acts automatically, during periods of deceleration of the vehicle, as a generator, thereby to return electric energy to the batteries, the controller means acting to permit the generator to return the electric energy at any frequency and any voltage.

31. Apparatus that comprises a power unit having two electrical power unit ports, said power unit comprising a plurality of stages connected in cascade, each stage having battery means, first bilateral switch means, second bilateral switch means, the first bilateral switch means and the second bilateral switch means acting in combination such that an input terminal of the stage and an output terminal thereof are shorted together and therefore at equal potential, or said battery means is connected between the two terminals such that one terminal is positive with respect to the other terminal or one terminal is negative with respect to the other terminal; the battery means in at least one of the stages comprising a plurality of batteries and assembly switch means that acts to interconnect the plurality of batteries in a controllable fashion; said apparatus further including controller means to control the first switch means and the second switch means of each stage of the plurality of stages in a pattern that provides a time-varying waveform at the power unit ports, said controller means being further adapted to control interconnection of the batteries in said at least one of the stages to control the instantaneous voltage of said time-varying waveform.

32. Apparatus that comprises a plurality of batteries, associated bilateral switch means, controller means, said switch means being operable to interconnect the batteries, said controller means acting to program the operation of the switch means so that interconnected batteries provide a time-varying waveform at the power ports of the apparatus, and means for charging the batteries connected to said power ports, said controller means acting to allow the batteries to be charged by controlling the interconnection of the batteries so that resulting instantaneous voltage at said power ports from the plurality of batteries differs from the instantaneous voltage of the source of electric energy connected to effect charging by a small controllable difference voltage $\Delta V$, changes in $\Delta V$ being effected under the direction of the controller means to establish a desired level of power flow between the means for charging and the batteries being charged.

33. An electric power unit that comprises, in combination, a plurality of electric storage batteries, switch means that acts to interconnect the storage batteries and controller means that acts to direct the switching pattern of the switch means so that the interconnected batteries present to the power ports of the power unit a periodic voltage waveform whose magnitude and frequency are controllably variable to permit, among other things, the regulation of energy flow at said power ports both as to direction of energy flow and magnitude of energy flow.

* * * * *